Feb. 14, 1950         R. SHEPPARD         2,497,695
EMERGENCY SHUTOFF DEVICE
Filed Jan. 22, 1944
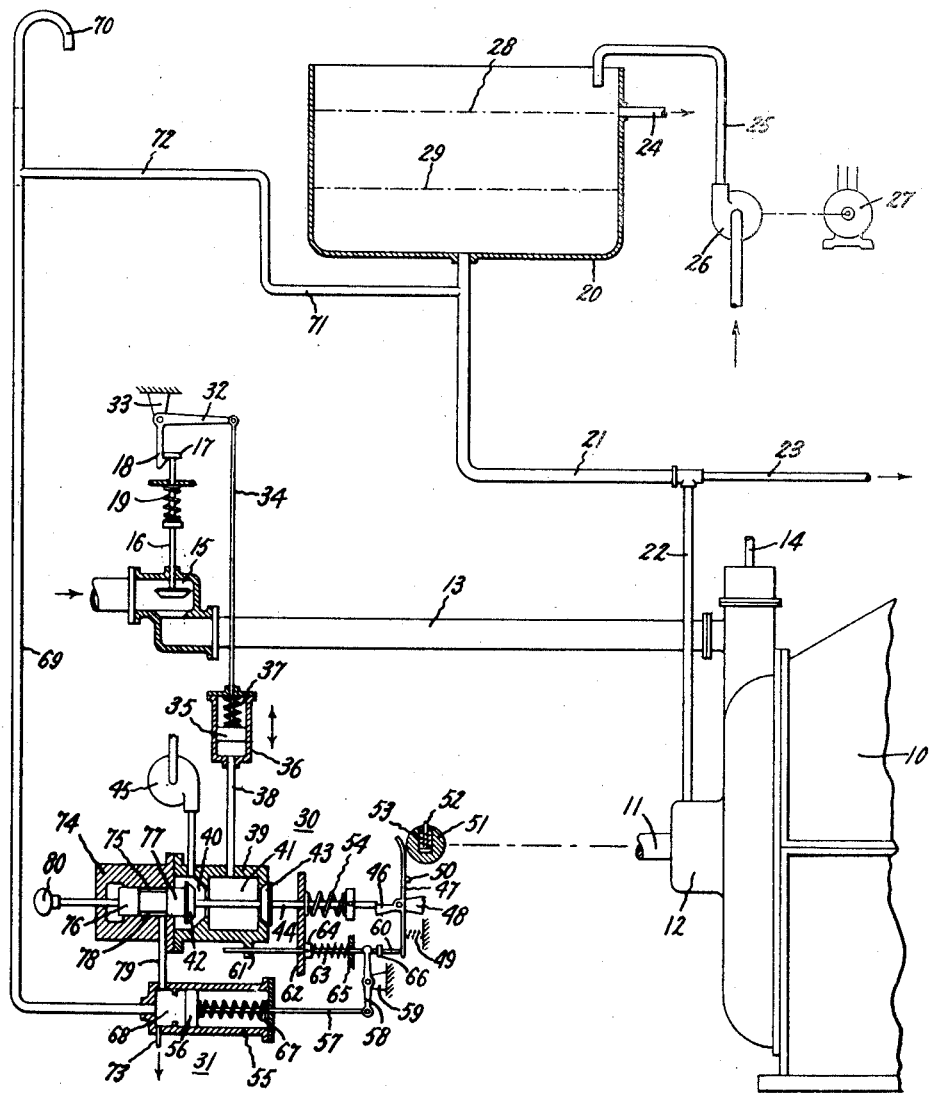
Inventor:
Raymond Sheppard,
by Harry E. Dunham
His Attorney.

Patented Feb. 14, 1950

2,497,695

UNITED STATES PATENT OFFICE 2,497,695

EMERGENCY SHUTOFF DEVICE

Raymond Sheppard, Niskayuna, N. Y., assignor to General Electric Company, a corporation of New York Application January 22, 1944, Serial No. 519,305

7 Claims. (Cl. 137—139)

The present invention relates to lubricating or liquid supply systems for turbines or like machines. More specifically, the invention relates to the kind of lubricant or liquid supply systems which include a tank or container for lubricant or liquid arranged at a level above that of the turbine bearing or consumer to feed lubricant to such turbine bearing or consumer by gravity together with means for shutting down the turbine or like machine associated with the consumer whenever the liquid supply from the tank or reservoir is endangered, that is, when the liquid in the reservoir reaches a certain low level. Heretofore it has been the practice to provide an emergency mechanism connected by a riser to the reservoir and adapted to disconnect the turbine or like machine upon a certain drop of the liquid level in the reservoir. Difficulties have been experienced with these arrangements in the refilling of the riser pipe due to the accumulation of air therein, which often makes it difficult, if not impossible, to reset the mechanism.

The object of my invention is to provide an improved construction and arrangement of lubricating or liquid supply systems of the type above specified whereby the aforementioned difficulties are overcome and the emergency mechanism may be readily reset.

This is accomplished in accordance with my invention by the provision of means including a liquid supply conduit connected to the lower end of the riser pipe to fill the latter from its lower end thus precluding the entrapping of air in said pipe during the resetting of the emergency mechanism.

For a better understanding of what I believe to be novel and my invention, attention is directed to the following description and the claims appended thereto in connection with the accompanying drawing.

The single figure of the drawing illustrates a lubricant or liquid supply system embodying my invention in connection with an elastic fluid turbine.

The arrangement as shown in the drawing comprises an elastic fluid turbine 10 having a shaft 11 supported on a bearing 12 and an inlet conduit 13 for conducting elastic fluid to the turbine. The flow of fluid through the conduit 13 is controlled by control valve means 14. A throttle or emergency shut-off valve 15 is arranged in the conduit 13 ahead of the control valve 14 as regards the direction of flow of fluid therethrough. The valve 15 has a stem 16 with an abutment 17 at its upper end engaging a latch 18 normally to hold the valve 15 in fully open position against the biasing force of a spring 19. Upon removal of the latch 18, the valve 15 is shut by action of the spring 19. A tank or reservoir 20 located at a level above that of the turbine is connected by a conduit 21 with branches 22, 23 to the bearing 12 and other elements forming part of or associated with the turbine and requiring lubricant or liquid under pressure during operation. The tank 20 has an overflow pipe 24. Liquid is supplied to the tank by means including a conduit 25 and a pump 26 driven by an electric motor or like power agency 27. During normal operating conditions it is desirable to maintain a liquid level 28 in the tank 20. If due to failure of the pump 26 or the power agency 27 or for any other reason the liquid in the tank drops to a predetermined level 29 which is considered unsafe it is desirable automatically to shut down the turbine 10. While there is still a substantial amount of liquid contained in the tank 20 at the level 29, such liquid or lubricant is needed especially for the bearings 12 in view of the considerable time it may take for the turbine to reach standstill upon shutting off the elastic fluid supply to the turbine.

The arrangement for shutting down the turbine upon the liquid in the tank 22 reaching the unsafe level 29 comprises an emergency speed governing mechanism 30 responsive to emergency speeds of the turbine 10 and an auxiliary mechanism 31 responsive to certain changes of the liquid level in the tank 20.

The emergency governing mechanism 30 includes a bell-crank 32 supported on a fulcrum 33 and having one arm forming the aforementioned latch 18 and another arm connected to the upper end of a stem 34 which at its lower end is secured to a piston 35 movably disposed in a hydraulic cylinder 36 biased downward by a spring 37. Fluid under pressure, such as oil, is supplied to the lower end of the cylinder 36 by a conduit 38 connected to a valve casing 39 forming two chambers 40 and 41 with openings controlled by valves 42 and 43 respectively secured to a stem 44. Operating fluid under pressure is supplied to the chamber 40 by means including a pump 45. In the position shown the valve 40 is open and valve 43 is closed, thus connecting the chambers 40, 41 in series between the pump 45 and the conduit 38. When the position of the valves 42, 43 is reversed, the chamber 41 is disconnected from the fluid supply and fluid contained in the chamber 41 and the hydraulic motor 36 is discharged through the open valve 43.

The valves 42, 43 normally are held in the position shown by means of a latch 46 secured to the intermediate portion of a lever 47 supported on a fulcrum 38 and biased into the position shown by a spring 49 against a stop 50. An upper portion of the lever 47 is associated with an emergency speed governor 51 which has a flyweight 52 biased inward against centrifugal force by a spring 53. During operation the flyweight 52 is forced outward by centrifugal force as the turbine reaches emergency speed whereby the lever 47 is engaged by the flyweight 52 and turned counter-clockwise, thus removing the latch 46 from the end of the stem 44 and causing the latter to be forced towards the right by the action of a compression spring 54. The mechanism so far described is typical of any emergency governing mechanism to close a throttle valve at emergency speed of a prime mover or like machine.

The auxiliary mechanism for effecting closing of the throttle valve below a safe level of the liquid in the tank 20 according to my invention comprises a pressure responsive device which in the present instance is in the form of a hydraulic motor having a cylinder 55 with a piston 56 slidably disposed therein and connected to a stem 57. The right-hand end of the stem 57 is connected to the lower end of a lever 58 having an intermediate point supported on a fulcrum 59 and an upper end cooperatively associated with a rod 60 slidably held on spaced bearing supports 61, 62. The rod 60 is biased towards the left by a spring 63 bearing at one end against a spring plate 64 secured to the rod 60 and at the other end against a fixed abutment 65. The right-hand end of the rod 60 is cooperatively associated with the lever 47. Upon clockwise movement of the lever 58 the upper end thereof engages an abutment 66 secured to the rod 60, forcing the latter to the right and thus causing counter-clockwise turning movement of the lever 47 and removal of the latch 46 from the right-hand end of the stem 44 whereby the latter is forced to the right, causing closing of the valve 42 and opening of the valve 43 in the manner described above.

The piston 56 is biased towards the left by a compression spring 67 against the fluid pressure in a chamber 68 formed on the left-hand side of the piston 56 in the cylinder 65. This chamber 68 is connected to receive fluid under pressure through a riser pipe 69 which has an upper open end portion or vent 70 above the tank 20. The riser pipe is connected to the tank 20 to receive liquid therefrom through a conduit 71 which in the present instance is connected to the aforementioned supply conduit 21 and has an upper horizontally extending portion 72 located at the level 29 in the tank 20. Hence liquid is supplied from the tank through the conduit 71 to the riser conduit 69 as long as the level in the tank is above the level 29. If, however, the level in the tank for some reason drops, the supply of liquid to the riser conduit 69 is discontinued as the liquid in the tank 20 reaches the level 29. The pressure chamber 68 has a bleed-off port or pipe 73 whereby fluid under pressure is continuously discharged from the chamber 68 and normally a continuous flow of liquid from the tank 20 through the conduit 69, 72 and the chamber 68 takes place. Upon interruption of such supply, as when the liquid in the tank 20 drops to the level 29, the level in the riser conduit 69 will rapidly drop due to the continued discharge of liquid through the bleed-off pipe 73. As the pressure in the chamber 68 reaches a certain minimum due to the low static pressure of the liquid column in the riser conduit 69 the piston 56 is forced to the left by action of the spring 67, thus causing unlatching of the latch 46 and reversing of the position of the emergency valves 42, 43, resulting in closing of the throttle valve 16.

If thereupon the necessary repairs have been made and liquid such as oil is again supplied from the pump 26 to the tank 20, it becomes necessary to reset the main and auxiliary mechanisms 30, 31. It has been found that the refilling of the riser pipe 69 from the tank 20 is undesirable because in many instances a substantial amount of air is entrapped in the riser conduit 69 so that the pressure in the chamber 68 does not rise sufficiently to force the piston 56 to the right to permit relatching of the latch 46. These difficulties are overcome by my invention by the provision of means for refilling the riser conduit 69 from its lower end. To this end the casing 39 of the emergency governing mechanism is provided with an extension 74 flanged to its left-hand end and having a cylindrical bore 75. Two pistons 76 and 77 are slidably disposed in the cylindrical bore 75 and attached to an extension of the stem 44 to form with the bore an annular chamber 78. This chamber is connected by a conduit 79 to the pressure chamber 68 in the cylinder 55. The extension 74 with the piston 77 broadly constitutes a valve for normally disconnecting the pressure chamber 68 from the chamber 40, which latter constitutes a source of liquid under pressure.

During operation the piston 56 is forced to the left as the liquid in the tank 20 drops below the level 29, thus causing unlatching of the latch 46 and reversing of the positions of the valves 42, 43 from that shown in the drawing. Upon closing of the valve 42 the piston 77 is moved into the chamber 40 whereby the latter is put into communication with the annular chamber 78. This causes supply of liquid under pressure from the pump 45 through the chambers 40, 75 and the conduit 79 to the chamber 68. The liquid is forced from the chamber 68 through the conduits 69 and 71. Thus the conduit 69 is filled from its lower end, eliminating the danger of air being entrapped in the conduit 69 and assuring that the proper pressure is established in the pressure chamber 68 as the liquid in the conduit 69 reaches the level 29. Thus, immediately upon actuation of the auxiliary governing mechanism the latter is automatically reset by the supply of fluid under pressure to the chamber 68 from the chamber 40. The turbine then may again be placed in operation by opening the throttle valve 16 and positioning the valves 42, 43 as shown in the drawing. To this end the left-hand end of the stem 44 is provided with a knob or handle 80, permitting resetting by pulling the handle towards the left against the force of the biasing spring 54. As this is done the latch 46 is forced into the position shown by action of the biasing spring 49.

What I claim as new and desire to secure by Letters Patent of the United States is:

1. In a liquid distribution system, the combination of a tank for containing liquid, a pressure responsive device located at a level below the tank and including a pressure chamber with a bleed port and a control member subject to the pressure in the chamber and arranged to move from a normal to an emergency position in accordance with changes in said pressure, means biasing the control member to emergency position, a standpipe arranged to conduct liquid from the tank to the chamber by gravity at a rate to maintain the chamber continuously full and to exert a pressure on the control member to retain it in the normal position as long as the liquid in the tank is above a predetermined level, the bleed port being arranged to empty the standpipe and pressure chamber when the supply of liquid from the tank to the standpipe ceases, and means for automatically refilling the standpipe and pressure chamber with liquid upon occurrence of a certain critical drop of the liquid level in the standpipe below said predetermined level, said refilling means comprising a source of liquid under pressure, a conduit connected between said source and chamber, a valve in the conduit, means biasing the valve toward open position, latching means normally holding the valve in closed position, and means associated with the control member for unlatching the latching means in response to a predetermined pressure change in the chamber corresponding to said critical drop in the level of liquid in the standpipe.

2. In a hydraulic system, a tank for containing liquid, a liquid level responsive device located at a level below the tank and including a liquid motor with a pressure chamber and a pressure sensing member having a normal and an emergency position, a bleed port arranged to empty the pressure chamber when the flow of liquid to the motor is discontinued, a standpipe and a conduit arranged to conduct liquid from the standpipe to the chamber at a rate to maintain the chamber continuously full and to exert a pressure on the pressure sensing member to retain it in normal position as long as the standpipe contains liquid to a first predetermined level, a conduit for supplying liquid from the tank to the standpipe and having a highest portion located at a level corresponding to a predetermined critical level of liquid in the tank, said conduit being so arranged that the flow of liquid from the tank to the standpipe is discontinued when the level of the liquid in the tank falls below said predetermined critical level, biasing means arranged to move the pressure sensing member from normal to emergency position when the level of liquid in the standpipe falls below said first predetermined level, and means including a source of liquid under pressure, a distributing valve, and a conduit for refilling the standpipe from its lower end to preclude air and foam being entrapped therein during the refilling operation.

3. In a liquid level responsive device, the combination of a control member having a normal position and an emergency position, means biasing the member to emergency position and retaining means for holding the member in normal position, a standpipe with means for supplying liquid thereto at a variable rate, a fluid pressure motor having a normal and an emergency position and arranged to release the retaining means when moved to emergency position, means biasing the motor to emergency position, conduit means arranged to supply liquid from the bottom of the standpipe to the motor at a rate sufficient to maintain the motor continuously full of liquid and to exert a pressure therein to hold it in normal position as long as the liquid in the standpipe is above a predetermined level, a bleed port arranged to drain the motor and standpipe when the supply of liquid thereto is insufficient, means for supplying liquid under pressure, a distributing valve associated with the control member and constructed and arranged so that liquid under pressure passes from the supply means to the motor and to the standpipe when the control member is in emergency position, and means for resetting the control member to normal position.

4. In a liquid level responsive device the combination of a control member having a normal position and an emergency position, means biasing the member to emergency position and retaining means for holding the member in normal position, a standpipe with means for supplying liquid thereto to a variable level, a first fluid pressure motor arranged to actuate an operating member, a second fluid pressure motor having a normal and an emergency position and arranged to release the retaining means when moved to emergency position, means biasing the second motor to emergency position, conduit means connected to supply liquid under pressure from the standpipe to the second motor whereby said motor is maintained against the biasing means in normal position as long as the liquid in the standpipe is above a predetermined level, means for supplying liquid under pressure, a distributing valve associated with the control member and constructed and arranged so that liquid under pressure passes from the supply means to the first motor when the control member is in normal position and from the supply means to the second motor and to the standpipe when the control member is in emergency position, valve means associated with the control member constructed and arranged to exhaust said pressure liquid from the first motor when the control member is in emergency position, and means for resetting the control member to normal position.

5. In combination with a liquid reservoir, a standpipe having a first upper portion communicating with the reservoir and a second lower portion communicating with a liquid level responsive device below the reservoir, said first portion being arranged to supply liquid continuously to the standpipe as long as the level of the liquid in the reservoir is above a predetermined level, a conduit connected to the upper portion of the standpipe and having a vent to atmosphere at a point above the highest level of liquid in the reservoir, the liquid level responsive device including a control member having a normal position and an emergency position, means biasing the member to emergency position and retaining means for holding the member in normal position, a fluid pressure motor having a normal and an emergency position and arranged to release the retaining means when moved to emergency position, means biasing the motor to emergency position, said motor being maintained in its normal position against its biasing means so long as the liquid in said reservoir is at a level above said predetermined level, means for supplying liquid under pressure, a distributing valve associated with the control member and constructed and arranged so that liquid under pressure passes from the supply means to the fluid pressure motor and to the lower end of the standpipe when the control member is in emergency position, a bleed port arranged to drain liquid from the motor and the standpipe, and means for resetting the control member to normal position.

6. In combination with a liquid reservoir, a control device including an operating member, a first fluid pressure motor having a normal and an emergency position and arranged to actuate the operating member, means biasing the first motor toward the emergency position, means for supplying liquid under pressure, a control member having a normal and an emergency position, a distributing valve associated with the control member constructed and arranged so that liquid under pressure will flow from the supply means to the first motor to maintain said first motor in its normal position when the control member is in normal position, valve means associated with the control member constructed and arranged so that the liquid under pressure will exhaust from said first motor when the control member is in emergency position, means biasing the control member to emergency position and retaining means for holding it in normal position, a second fluid pressure motor having a normal position and an emergency position and arranged to release the retaining means when moved to emergency position, means biasing the second motor to emergency position, conduit means communicating to the second motor a variable pressure which is sufficient to maintain the second motor in normal position against said biasing means when the liquid in the reservoir is above a predetermined minimum level, the distributing valve associated with the control member being also arranged to supply liquid under pressure to the second motor to restore it to normal position when the control member is in emergency position, and means for restoring the control member to normal position to cut off the flow of liquid to the second motor and supply liquid under pressure to the first motor to restore it to normal position.

7. In combination with a pressure liquid supply source, a control device including an operating member, a first fluid pressure motor having a normal and an emergency position and arranged to actuate the operating member, means biasing the first motor toward the emergency position, a distributing valve having a normal and an emergency position and constructed and arranged when in normal position to effect the flow of liquid under pressure from supply means to the first motor to maintain said first motor in its normal position, an exhaust valve associated with said distributing valve constructed and arranged to effect the flow of pressure liquid from said first motor when the distributing valve is in emergency position, means biasing the distributing and exhaust valves to emergency position and retaining means adapted to hold the valves in normal position against the force of the biasing means, a second fluid pressure motor having a normal and an emergency position, means biasing the second motor to emergency position, conduit means communicating liquid from the supply source to the second motor to maintain it in normal position against said biasing means when the pressure of said liquid from said source is above a predetermined value, means associated with the second motor to release the retaining means when the second motor moves to emergency position, conduit means arranged to conduct liquid under pressure from the distributing valve to the second motor when the distributing valve is in emergency position to reset the second motor to normal position, and means for resetting the distributing and exhaust valves from emergency position to normal position to again effect the flow of liquid under pressure from the supply to the first motor to reset it to normal position.

RAYMOND SHEPPARD.

REFERENCES CITED

The following references are of record in the file of this patent:

UNITED STATES PATENTS

| Number | Name | Date |
|---|---|---|
| 1,401,239 | Cockburn | Dec. 27, 1921 |
| 1,934,631 | Taylor | Nov. 7, 1933 |
| 2,099,556 | Carpenter | Nov. 16, 1937 |